(12) United States Patent
Adams et al.

(10) Patent No.: US 9,786,281 B1
(45) Date of Patent: Oct. 10, 2017

(54) HOUSEHOLD AGENT LEARNING (75) Inventors: Jeffrey P. Adams, Tyngsborough, MA (US); Stan W. Salvador, Tega Cay, SC (US); Reinhard Kneser, Aachen (DE)

(73) Assignee: Amazon Technologies, Inc., Reno, NV (US)

( * ) Notice: Subject to any disclaimer, the term of this patent is extended or adjusted under 35 U.S.C. 154(b) by 205 days.

(21) Appl. No.: 13/565,725

(22) Filed: Aug. 2, 2012

(51) Int. Cl.
*G10L 21/06* (2013.01)
*G10L 15/22* (2006.01)
*G10L 15/26* (2006.01)
*G10L 15/08* (2006.01)
*G10L 19/12* (2013.01)
*G10L 15/20* (2006.01)

(52) U.S. Cl.
CPC ............ *G10L 15/26* (2013.01); *G10L 15/265* (2013.01)

(58) Field of Classification Search
CPC ..... G10L 15/063; G10L 15/187; G10L 15/08; G10L 15/30; G10L 15/22; G10L 15/265; G10L 13/08; G06F 17/2785; G06F 17/289; G06F 17/005; H05K 999/99; G11C 2207/16; H04R 3/005; H04N 7/181; G08B 13/19602
USPC ........... 704/9, 244, 275, 260, 254, 246, 240, 704/270.1, 2, 249, 201, 257, 235, 251; 381/92; 715/789, 753, 716, 738; 725/106, 36, 45, 46, 13, 117; 345/173, 345/633
See application file for complete search history.

(56) References Cited

U.S. PATENT DOCUMENTS

| | | | | |
|---|---|---|---|---|
| 6,064,303 A * | 5/2000 | Klein | ...................... | G06F 3/023 340/506 |
| 6,160,570 A * | 12/2000 | Sitnik | ............................... | 725/9 |
| 6,263,308 B1 * | 7/2001 | Heckerman | ........... | G10L 15/063 704/231 |
| 6,311,157 B1 * | 10/2001 | Strong | ................ | G10L 15/1822 704/243 |
| 6,442,519 B1 * | 8/2002 | Kanevsky et al. | ............ | 704/243 |
| 6,615,178 B1 * | 9/2003 | Tajima | .......................... | 704/277 |
| 7,162,728 B1 * | 1/2007 | Bahn | ............................... | 725/36 |
| 7,236,931 B2 * | 6/2007 | He et al. | ........................ | 704/235 |
| 7,620,549 B2 * | 11/2009 | Di Cristo et al. | ............ | 704/257 |
| 8,260,266 B1 * | 9/2012 | Amidon et al. | ........... | 455/414.1 |
| 8,260,615 B1 * | 9/2012 | Nakajima | ............. | G10L 15/183 704/2 |
| 8,352,245 B1 * | 1/2013 | Lloyd | .................... | G10L 15/183 704/9 |
| 8,528,019 B1 * | 9/2013 | Dimitrova et al. | ............. | 725/46 |
| 8,675,071 B1 * | 3/2014 | Slavin | .................... | H04M 11/04 348/143 |

(Continued)

*Primary Examiner* — Anne Thomas-Homescu
(74) *Attorney, Agent, or Firm* — Knobbe, Martens, Olson & Bear, LLP (57) ABSTRACT

A user profile for a plurality of users may be built for speech recognition purposes and for acting as an agent of the user. In some embodiments, a speech processing device automatically receives an utterance from a user. The utterance may be analyzed using signal processing to identify data associated with the user. The utterance may also be analyzed using speech recognition to identify additional data associated with the user. The identified data may be stored in a profile of the user. Data in the user profile may be used to select an acoustic model and/or a language model for speech recognition or to take actions on behalf of the user.

37 Claims, 5 Drawing Sheets (56) References Cited

U.S. PATENT DOCUMENTS

| | | | | |
|---|---|---|---|---|
| 8,700,392 B1* | 4/2014 | Hart | | G10L 15/25 704/231 |
| 8,738,376 B1* | 5/2014 | Goel et al. | | 704/240 |
| 8,751,957 B1* | 6/2014 | Trajkovic et al. | | 715/789 |
| 8,793,122 B2* | 7/2014 | White | | G06F 3/0236 369/25.01 |
| 8,798,311 B2* | 8/2014 | Capless | | G06K 9/00335 382/100 |
| 8,914,526 B1* | 12/2014 | Lindquist | | H04L 29/06 709/229 |
| 8,949,124 B1* | 2/2015 | Wooters | | G10L 15/065 704/235 |
| 9,633,653 B1* | 4/2017 | Porter | | G10L 15/1815 |
| 2002/0035477 A1* | 3/2002 | Schroder | | G10L 17/00 704/275 |
| 2002/0182573 A1 | 12/2002 | Watson | | |
| 2003/0105630 A1* | 6/2003 | MacGinitie et al. | | 704/235 |
| 2003/0171932 A1 | 9/2003 | Juang et al. | | |
| 2003/0172381 A1* | 9/2003 | Janevski | | 725/46 |
| 2004/0044516 A1* | 3/2004 | Kennewick et al. | | 704/5 |
| 2004/0260543 A1* | 12/2004 | Horowitz et al. | | 704/221 |
| 2005/0096907 A1* | 5/2005 | Bacchiani | | G06K 9/6226 704/257 |
| 2005/0105712 A1* | 5/2005 | Williams | | G10L 13/027 379/265.02 |
| 2005/0159957 A1* | 7/2005 | Roth et al. | | 704/276 |
| 2005/0262542 A1* | 11/2005 | DeWeese et al. | | 725/106 |
| 2006/0038794 A1* | 2/2006 | Shneidman | | 345/173 |
| 2006/0074659 A1* | 4/2006 | Adams | | G10L 15/26 704/251 |
| 2006/0221183 A1* | 10/2006 | Sham | | H04N 7/186 348/155 |
| 2007/0032225 A1* | 2/2007 | Konicek | | H04M 1/72513 455/417 |
| 2007/0033005 A1* | 2/2007 | Cristo et al. | | 704/9 |
| 2007/0055514 A1* | 3/2007 | Beattie | | G10L 15/26 704/235 |
| 2007/0088554 A1* | 4/2007 | Harb et al. | | 704/257 |
| 2007/0101368 A1* | 5/2007 | Jacoby et al. | | 725/45 |
| 2007/0124134 A1* | 5/2007 | Van Kommer | | 704/9 |
| 2007/0192910 A1* | 8/2007 | Vu | | B25J 5/007 700/245 |
| 2008/0040099 A1* | 2/2008 | Wu | | G06F 17/275 704/9 |
| 2008/0059167 A1* | 3/2008 | Poultney et al. | | 704/231 |
| 2008/0082332 A1* | 4/2008 | Mallett et al. | | 704/250 |
| 2008/0089665 A1* | 4/2008 | Thambiratnam | | G06F 17/30781 386/241 |
| 2008/0091412 A1* | 4/2008 | Strope | | G10L 15/26 704/10 |
| 2008/0228480 A1* | 9/2008 | Maegawa | | G10L 15/07 704/235 |
| 2008/0300886 A1 | 12/2008 | Patch | | |
| 2008/0309449 A1* | 12/2008 | Martin | | G08B 25/08 340/3.1 |
| 2009/0030698 A1* | 1/2009 | Cerra et al. | | 704/275 |
| 2009/0043573 A1* | 2/2009 | Weinberg | | H04L 63/302 704/223 |
| 2009/0055185 A1* | 2/2009 | Nakade | | G10L 15/30 704/257 |
| 2009/0172720 A1* | 7/2009 | Kiiskinen | | H04N 5/445 725/9 |
| 2009/0204410 A1* | 8/2009 | Mozer | | G10L 15/30 704/275 |
| 2009/0240496 A1* | 9/2009 | Yamamoto | | G10L 15/20 704/233 |
| 2009/0313295 A1* | 12/2009 | Blaxland et al. | | 707/103 R |
| 2010/0146278 A1* | 6/2010 | Maier | | H04N 5/4403 713/171 |
| 2010/0180202 A1* | 7/2010 | Del Valle Lopez | | G06F 3/048 715/728 |
| 2010/0312555 A1* | 12/2010 | Plumpe et al. | | 704/231 |
| 2010/0317396 A1* | 12/2010 | Reynolds et al. | | 455/550.1 |
| 2011/0003577 A1* | 1/2011 | Rogalski | | H04M 1/2725 455/404.1 |
| 2011/0035031 A1* | 2/2011 | Faenger et al. | | 700/94 |
| 2011/0077943 A1* | 3/2011 | Miki | | G10L 15/183 704/250 |
| 2011/0078172 A1* | 3/2011 | LaJoie et al. | | 707/769 |
| 2011/0078729 A1* | 3/2011 | LaJoie et al. | | 725/36 |
| 2011/0099013 A1* | 4/2011 | Melamed | | G10L 15/19 704/255 |
| 2011/0099263 A1* | 4/2011 | Patil et al. | | 709/224 |
| 2011/0157168 A1* | 6/2011 | Bennett | | G06F 3/14 345/419 |
| 2011/0166859 A1* | 7/2011 | Suzuki | | G10L 15/06 704/246 |
| 2011/0184735 A1 | 7/2011 | Flaks et al. | | |
| 2011/0209062 A1* | 8/2011 | Faenger et al. | | 715/716 |
| 2011/0219421 A1* | 9/2011 | Ullman et al. | | 725/117 |
| 2011/0264451 A1* | 10/2011 | Hoepfinger | | G10L 15/063 704/235 |
| 2011/0288869 A1* | 11/2011 | Menendez-Pidal | | G10L 15/144 704/256.1 |
| 2011/0307241 A1* | 12/2011 | Waibel et al. | | 704/2 |
| 2012/0053936 A1* | 3/2012 | Marvit | | 704/235 |
| 2012/0063649 A1* | 3/2012 | Pettit et al. | | 382/118 |
| 2012/0089689 A1* | 4/2012 | Tan | | 709/206 |
| 2012/0102410 A1* | 4/2012 | Gewecke et al. | | 715/738 |
| 2012/0108230 A1* | 5/2012 | Stepanian | | 455/422.1 |
| 2012/0113253 A1* | 5/2012 | Slater | | H04N 7/185 348/143 |
| 2012/0123779 A1* | 5/2012 | Pratt et al. | | 704/235 |
| 2012/0130714 A1* | 5/2012 | Zeljkovic et al. | | 704/235 |
| 2012/0223899 A1* | 9/2012 | Gazdzinski | | 345/173 |
| 2012/0245934 A1* | 9/2012 | Talwar et al. | | 704/235 |
| 2012/0253790 A1* | 10/2012 | Heck et al. | | 704/9 |
| 2012/0253799 A1* | 10/2012 | Bangalore et al. | | 704/231 |
| 2012/0253802 A1* | 10/2012 | Heck | | G06F 17/30528 704/235 |
| 2012/0265811 A1* | 10/2012 | Bist | | 709/204 |
| 2012/0282906 A1* | 11/2012 | Frye | | H04W 4/04 455/414.2 |
| 2012/0295708 A1 | 11/2012 | Hernandez-Abrego et al. | | |
| 2012/0296652 A1* | 11/2012 | Hill et al. | | 704/251 |
| 2012/0316871 A1* | 12/2012 | Koll et al. | | 704/231 |
| 2012/0323557 A1* | 12/2012 | Koll | | G06F 17/276 704/8 |
| 2013/0024799 A1* | 1/2013 | Fadell | | G05D 23/1902 715/771 |
| 2013/0039531 A1* | 2/2013 | Basso | | G06F 3/017 382/103 |
| 2013/0046542 A1* | 2/2013 | Papakipos et al. | | 704/270 |
| 2013/0054238 A1* | 2/2013 | Bodell et al. | | 704/235 |
| 2013/0080167 A1* | 3/2013 | Mozer | | 704/246 |
| 2013/0083018 A1* | 4/2013 | Geisner | | G06F 3/011 345/420 |
| 2013/0143535 A1* | 6/2013 | Leppanen et al. | | 455/414.1 |
| 2013/0174188 A1* | 7/2013 | Gagnon et al. | | 725/13 |
| 2013/0179161 A1* | 7/2013 | Zopf et al. | | 704/230 |
| 2013/0218573 A1* | 8/2013 | Cheng | | G10L 15/22 704/275 |
| 2013/0238330 A1* | 9/2013 | Casella dos Santos | | G10L 15/183 704/235 |
| 2013/0253932 A1* | 9/2013 | Ariu | | G10L 15/22 704/246 |
| 2013/0263018 A1* | 10/2013 | Xiong et al. | | 715/753 |
| 2013/0288212 A1* | 10/2013 | Bist | | 434/236 |
| 2013/0290504 A1* | 10/2013 | Quady | | H04L 41/50 709/223 |
| 2013/0297307 A1* | 11/2013 | Paek et al. | | 704/235 |
| 2013/0304479 A1 | 11/2013 | Teller et al. | | |
| 2013/0307771 A1 | 11/2013 | Parker et al. | | |
| 2013/0332147 A1* | 12/2013 | Corfield | | 704/201 |
| 2013/0346068 A1* | 12/2013 | Solem et al. | | 704/9 |
| 2013/0346079 A1* | 12/2013 | Miglietta et al. | | 704/235 |
| 2014/0006660 A1* | 1/2014 | Frei | | H04L 29/1249 710/104 |
| 2014/0012910 A1* | 1/2014 | White | | 709/204 |

(56) References Cited

U.S. PATENT DOCUMENTS

| | | | | |
|---|---|---|---|---|
| 2014/0025380 A1* | 1/2014 | Koch | ............... | G10L 15/1822 |
| | | | | 704/257 |
| 2014/0039887 A1* | 2/2014 | Dzik | ............... | G10L 15/26 |
| | | | | 704/235 |
| 2014/0039893 A1* | 2/2014 | Weiner | ............... | 704/249 |
| 2014/0063055 A1* | 3/2014 | Osterhout et al. | ............... | 345/633 |
| 2014/0108012 A1* | 4/2014 | Reichardt et al. | ............... | 704/246 |
| 2014/0108013 A1* | 4/2014 | Di Cristo et al. | ............... | 704/254 |
| 2014/0114662 A1* | 4/2014 | Pulz et al. | ............... | 704/254 |
| 2014/0129218 A1* | 5/2014 | Liu | ............... | G10L 15/32 |
| | | | | 704/231 |
| 2014/0244252 A1* | 8/2014 | Dines | ............... | G10L 15/183 |
| | | | | 704/235 |
| 2014/0249821 A1* | 9/2014 | Kennewick et al. | ............... | 704/257 |
| 2015/0054639 A1* | 2/2015 | Rosen | ............... | G06K 9/00785 |
| | | | | 340/439 |
| 2015/0234636 A1* | 8/2015 | Barnes, Jr. | ............... | G06F 3/167 |
| | | | | 715/728 |

* cited by examiner

HOUSEHOLD AGENT LEARNING

BACKGROUND

Computing devices have become more commonly used to help people take control of their lives. For example, computing devices help people remember dates, schedule tasks, perform everyday functions, and the like. Voice control of such computing devices may be helpful because it may allow people to interact with the computing devices without having to physically type or enter commands. Often, people are on the move, and the use of voice control allows them to activate the computing device in order to provide a command. Speech processors associated with such voice control computing devices may use generalized models to understand what was spoken. However, people speak and communicate in many different ways (with a wide variety of different speech patterns). Because of this, the accuracy of the speech processors associated with such voice control computing devices may vary. Some people with a first speech pattern or vocabulary may see highly accurate results, while other people with a second speech pattern or vocabulary may see less accurate results.

Furthermore, people may find these voice control computing devices to be inconvenient. The voice control computing devices generally require a certain degree of deliberate action on the part of the user. For example, the user may be required to press a button, start an application, or otherwise interact with the voice control computing device. In some circumstances, such as when a person's hands are occupied, it may not be possible for a person to perform these deliberate actions. An intelligent device would not call for a person to change his or her behavior in order to obtain the benefits of voice control. What is needed is a device that helps a person in his or her everyday life and that improves speech recognition based upon knowledge about the person and what his or her interests are without forcing the person to change his or her behavior.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Introduction

A device that learns about a single person or a group of people (e.g., a household, office, club, etc.) may provide for higher accuracy speech recognition and may aid the single person or group of people in carrying out everyday tasks. Conventional systems may be configured to learn how a person speaks and to learn characteristics of the person; however, these systems may require user participation. For example, a person may need to interact with a conventional system, such as by verbally answering a series of questions or reading aloud a large amount of predetermined text, in order for the system to learn how the person speaks. Likewise, the person may need to interact with the conventional system, such as by entering answers to a series of questions, in order for the system to learn characteristics of the person. Accordingly, it may be desirable to construct a device that learns how a person speaks and that learns information about the person without the person having to interact with the device (e.g., without the person having to direct communications to the device).

To enable a device that learns about a person in this way, the device may be configured to automatically gather and analyze data that originates from the person. The device may gather data from a variety of sources related to the person or group, as well. For example the device may actively listen for and receive utterances spoken by a person, text data generated by the person, data gathered from devices associated with the person, or data gathered from social networks (e.g., from a profile of the person that is hosted by a social network).

Natural language processing or artificial intelligence may be used to parse the gathered data and extract relevant information about the person. For example, relevant information may include the person's age, the person's gender, the person's accent, the language spoken by the person, the person's profession, the person's hobbies, the person's habits, the person's preferences, the person's temporary condition, the person's health, the person's schedule, agenda, itinerary, appointments, tastes (e.g., in music, film, goods, services, etc.) or plans, the tasks the person needs to complete, a specific person or type of person that may arrive, and the like.

Such relevant information may be used to build a profile of the person. The profile may allow the device to provide improved speech recognition when analyzing the person's speech. For example, in some embodiments, such a device may use information from the person's profile to select one or both of an acoustic model and a language model that best suits the single person or group of people. For example, the profile may indicate the person's interests or characteristics of the person. Acoustic models and language models may be tailored to specific interests or characteristics. Accordingly, the device may select the acoustic model and the language model that is tailored or specific to the person's interests or characteristics. In some embodiments, the device may actually modify an acoustic and/or language model based upon information from the person's profile, as well.

In addition, the profile may enable the device to serve as an agent for the person. For example, the device may use the profile information to help the person organize his or her life. In some embodiments, the device uses the person's profile to generate notifications, reminders, or suggestions, perform tasks for the person, and/or authenticate the person when the person is interacting with secure services, websites, etc.

Moreover, if desired by the person, the profile may enable the device to generate advertisements and/or recommendations that are customized for the person. For example, the device may generate the advertisements and/or recommendations for display or use on any device. As another example, select (and perhaps anonymous or privacy-protected) user profile data may be forwarded to other devices to allow other services to improve customized advertising The device may be configured to build profiles for one or more persons. Gathered data may be parsed and associated with the person from whom the data originated. For example, if the device is analyzing an utterance, the device may identify the speaker of the utterance by using speaker recognition techniques. Any relevant information extracted from the utterance may then be associated with the identified speaker.

Accordingly, aspects of the present disclosure are directed to building user profiles and using the user profiles to improve speech recognition and to act as an agent for the user. Aspects of the present disclosure may be practiced in a networked computing environment. For example, a speech processing device or a speech recognition server device may host a speech recognition service on a network. During the user profile building process, the speech processing device may receive utterances from the user (e.g., through a microphone or receiver) without the user interacting with or explicitly activating the speech processing device. For example, in some embodiments the user profile is built without the person having to direct communications to the speech processing device. The speech processing device may use speech recognition technology to determine what was likely uttered by the user, and identify learned information about the user from what the user likely said. In some embodiments, the speech recognition server device may determine what was likely uttered by the user. Such information may be stored and associated with the particular user that made the utterance. An acoustic model and/or a language model specific to the particular user may be selected, created, or adapted based on the stored information when the user speaks.

The speech processing device may perform agent services on behalf of the user, as well. For example, in some embodiments, the speech processing device can generate a notification or suggestion based on the information gleaned from past utterances. For example, if the user is speaking to a friend and happens to reference a future date, task, appointment, anniversary, birthday, etc. (e.g., "next week is my mom's birthday"), the speech processing device can automatically set a reminder and/or an alarm within the user's electronic calendar, or it can remind the user of the date by contacting the user at the appropriate time via any of a variety of methods (e.g., sending an email, text, phone call, spoken message when the person is sensed to be near the speech processing device, etc.).

In other embodiments, the speech processing device can improve the performance of a speech recognition system by selecting user-relevant language and/or acoustic models, and/or updating a language and/or acoustic model based on the information gleaned. For example, the speech processing device can analyze the user's speech patterns to derive training information, statistical information, etc. for use with an acoustic model.

Furthermore, in other embodiments, the speech processing device is configured to perform various tasks for the user, where the tasks are derived from the information gleaned, as well as use the stored information to authenticate the user with any of a variety of secure services. For example, if the speech processing device hears the person speaking to a third party and mention that he is running low on his prescription medication, or that his car needs to be serviced, etc., the speech processing device can contact the relevant service provider on behalf of the user to fulfill the user's needs. For example, the speech processing device can contact the user's pharmacy to order a refill of the prescription, or contact the car dealership to schedule an appointment to have the car serviced. These examples are merely provided for illustrative purposes, as any of a variety of tasks or services may be provided by the speech processing device on behalf of, or for the benefit of the user.

System Setup—Devices in Home and in Cloud

Figure 1:
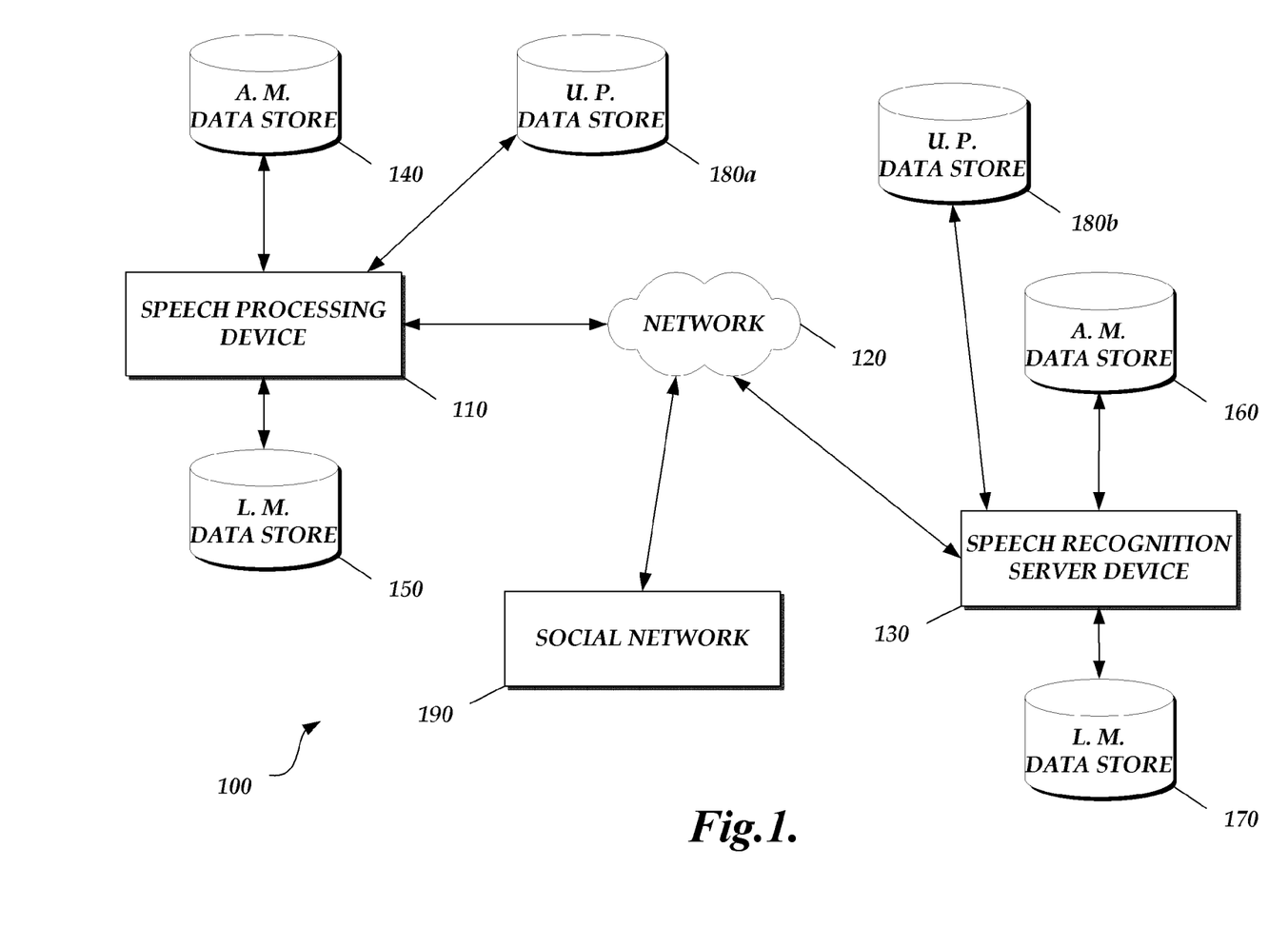
FIG. 1 is a system diagram depicting a speech processing device in an illustrative network environment.

FIG. 1 illustrates a system diagram depicting a speech processing device 110 in an illustrative network environment 100. In some embodiments, the network environment 100 includes the speech processing device 110, a network 120, a speech recognition server device 130, an acoustic model data store 140, a language model data store 150, an acoustic model data store 160, a language model data store 170, user profile data stores 180a-b, and/or a social network 190. The speech processing device 110 may be a computing device. For example, the speech processing device 110 may be an electronic device, such as a laptop or tablet computer, personal computer, personal digital assistant (PDA), hybrid PDA/mobile phone, mobile phone, global positioning system (GPS) device, electronic book reader, set-top box, camera, clock, watch, audiobook player, digital media player, video game console, in-store kiosk, television, one or more processors, integrated components for inclusion in computing devices, appliances, electronic devices for inclusion in vehicles or machinery, gaming devices, or the like. The speech processing device 110 may include a microphone, a speaker, a wireless module, a camera, and/or a display. As discussed herein, additional devices, such as sensor devices (e.g., cameras, touch-sensitive devices, motion-sensing devices, proximity sensors, microphones, GPS devices, etc.), not shown, may be coupled to the speech processing device 110. The speech processing device 110 is described in greater detail with respect to FIG. 5.

In an embodiment, the speech processing device 110 is configured to improve speech recognition and/or to act as an agent for the user associated with the speech processing device 110. The speech processing device 110 may be located in a location frequented by the user, such as the user's home. Alternatively, the speech processing device 110 may be located in a vehicle, at an office, in a public place (e.g., a pay phone, an automated teller machine (ATM), a network hotspot, a restaurant, etc.), or the like. The speech processing device 110 may be further configured to receive and recognize utterances, for example, by receiving utterances via a microphone or other receiving device, and processing the utterances with a speech recognizer or other such device.

In an embodiment, the speech processing device 110 may operate in an active mode and/or in a passive mode. For example, in an active mode, the speech processing device 110 may be operated via interaction or activation from a user. In a passive mode, the speech processing device 110 may operate even without interaction or activation from a user. The speech processing device 110 may be intermittently active, or it may become active upon a particular predetermined condition. For example, the speech processing device 110 need not be active at all times, but may instead automatically become active based upon one or more of the following conditions: (1) at predetermined times, (2) when speech is detected, (3) when the presence of a speaker is detected (e.g., by sensing a speaker with a camera, sensor, proximity sensor, thermometer, and/or microphone, etc.), as well as the occurrence of other events or conditions.

The speech processing device 110 may be in communication with the acoustic model data store 140 and/or the language model data store 150. The acoustic model data store 140 may include an acoustic model associated with the speech processing device 110. While the network environment 100 includes a single acoustic model data store 140, the network environment 100 may include any number of acoustic model data stores 140. For example, the network environment 100 may include an acoustic model data store 140 for each speech processing device 110 that the speech recognition server device 130 is in communication with. In some embodiments, the acoustic model data store 140 stores multiple acoustic models, each corresponding to one or more user characteristics.

Likewise, the language model data store 150 may include a language model associated with the speech processing device 110. While the network environment 100 includes a single language model data store 150, the network environment 100 may include any number of language model data stores 150. For example, the network environment 100 may include a language model data store 150 for each speech processing device 110 that the speech recognition server device 130 is in communication with. Each language model data store 150 may store multiple language models, each corresponding to one or more user characteristics.

The speech processing device 110 may be in communication with a speech recognition server device 130 directly or through a network 120. The network 120 may be a wired network, a wireless network, or a combination of the two. For example, the network 120 may be a personal area network, a local area network (LAN), a wide area network (WAN), cable network, satellite network, cellular telephone network, the Internet, and/or combinations of the same. Protocols and components for communicating via the Internet or any of the other aforementioned types of communication networks, such as the TCP/IP protocols, can be used in the network 120.

The speech recognition server device 130 may be a computing device. For example, the speech recognition server device 130 may include one or more processors to execute one or more instructions, memory, and communication devices to transmit and receive data over the network 120. In some embodiments, the speech recognition server device 130 is implemented as one or more backend servers capable of communicating over a network. In other embodiments, the speech recognition server device 130 is implemented by one more virtual machines in a hosted computing environment. The hosted computing environment may include one or more rapidly provisioned and released computing resources, which computing resources may include computing, networking and/or storage devices. A hosted computing environment may also be referred to as a cloud computing environment. In still other embodiments, the speech recognition server device 130 may be represented as a user computing device capable of communicating over a network, such as a laptop or tablet computer, personal computer, personal digital assistant (PDA), hybrid PDA/mobile phone, mobile phone, or the like. While FIG. 1 illustrates a single speech processing device 110, the speech recognition server device 130 may be in communication with a plurality of speech processing devices 110.

In one embodiment, the speech recognition server device 130 is in communication with the acoustic model data store 160 and/or the language model data store 170. The acoustic model data store 160 may include a general purpose acoustic model. The language model data store 170 may include a general purpose language model.

System Used for Speech Recognition

In an embodiment, devices of the network environment 100 may be used to recognize speech uttered by a user. For example, the speech recognition server device 130 may be configured to determine a likely word sequence based on an utterance received by the speech processing device 110 from a user. The speech recognition server device 130 may use the general purpose acoustic model and/or the general purpose language model in making this determination.

In an embodiment, the speech processing device 110 may receive the utterance from the user via an input device, such as a microphone. In some aspects, the speech processing device 110 passively receives the utterance. For example, the speech processing device 110 may receive the utterance without any interaction and/or explicit activation from the user. For example, the speech processing device 110 can automatically detect and receive the utterance without requiring the user to manually interact with the speech processing device 110 immediately beforehand. In one embodiment, the user does not need to press a button for the speech processing device 110 to receive and process the user's utterances.

In some embodiments, using the acoustic model stored in the acoustic model data store 140, the speech processing device 110 generates, using an internal speech recognition system, at least one phoneme based on the utterance, converts the phonemes into words, phrases, and the like, and determines a probability or likelihood (e.g., represented as a score) that each word or phrase was uttered by the user. Based on the determined probabilities, the speech processing device 110 may determine the word sequence that was most likely uttered by the user.

In other embodiments, the speech processing device 110 transmits the utterance (e.g., in the form of an acoustic file) to the speech recognition server device 130 through the network 120. The speech recognition server device 130 may then use the general purpose acoustic model stored in the acoustic model data store 160 and/or the general purpose language model stored in the language model data store 170 to determine the probability or likelihood that a word or phrase was uttered by the user. In some embodiments, based on the determined probabilities, the speech recognition server device 130 may determine the word sequence that was most likely uttered by the user. The speech recognition server device 130 may transmit this information to the speech processing device 110, may transmit this information to another device, or take an action on behalf of, or for the benefit of the user. In other embodiments, the speech processing device 110 may receive the probabilities from the speech recognition server device 130 and determine the word sequence that was most likely uttered by the user by conducting further speech processing using acoustic model and/or language model information specific to the particular user.

In still other embodiments, the speech processing device 110 determines probabilities that a word or phrase was uttered by the user using the acoustic model stored in the acoustic model data store 140 and the language model stored in the language model data store 150 as described above. In addition, the speech processing device 110 may transmit the utterance (e.g., in the form of an acoustic file) to the speech recognition server device 130. The speech recognition server device 130 may then use the general purpose acoustic model stored in the acoustic model data store 160 and the general purpose language model stored in the language model data store 170 to determine probabilities that a word or phrase was uttered by the user. The speech processing device 110 may then determine the word sequence that was most likely uttered by the user based on the probabilities determined by the speech processing device 110 and the probabilities determined by the speech recognition server device 130.

In an embodiment, the speech recognition server device 130 may take a first pass at determining the probabilities.

The speech processing device 110 may then perform second pass speech processing to determine the probabilities, where the speech processing device 110 may take the speech recognition server device 130 probabilities into account in making its determination. The probabilities determined by the speech processing device 110 may be used to determine the word sequence that was most likely uttered by the user.

In some embodiments, an acoustic model specific to a user may be used in performing speech recognition, and the specific acoustic model may be created using user information from a user profile associated with the user. The specific acoustic model may be created by selecting an acoustic model from a plurality of acoustic models, adapting an existing acoustic model, or by creating a new acoustic model. For example, an acoustic model may be selected from a plurality of acoustic models that matches characteristics of a user, such as the user's age, gender, location, and/or native language. In another example, an existing acoustic model may be adapted using techniques known to one of skill in the art, such as MAP (maximum a posteriori) or cMLLR (constrained maximum likelihood linear regression) adaptation. In another example, a new acoustic model may be trained using audio that corresponds to a user. Any of the acoustic models described above may be used in conjunction with or combined with a general purpose acoustic model.

In some embodiments, a language model specific to a user may be used in performing speech recognition, and the specific language model may be created using user information from a user profile associated with the user. The specific language model may be created by selecting a language model from a plurality of language models, adapting an existing language model, or by creating a new language model. For example, a language model may be selected from a plurality of language models that matches topics relevant to a user, such as the user's hobbies, profession, or other interests. In another example, an existing language model may be adapted using techniques known to one of skill in the art, such as language model interpolation. In another example, a new language model may be trained using text that corresponds to a user. Any of the language models described above may be used in conjunction with or combined with a general purpose language model.

Building a User Profile

In an embodiment, the speech processing device 110 may be configured to build and/or update a profile for one or more users. Each profile may be based on data associated with a particular user, such as data identified from utterances associated with the particular user, text data generated by the particular user, data gathered from devices associated with the particular user, and/or data gathered from social networks (e.g., from a profile of the particular user that is hosted by a social network). For example, the data may include data that identifies a user or is otherwise associated with the user, such as an age of the user, a gender of the user, an accent of the user, a language spoken by the user, a profession of the user, a name of the user, one or more hobbies of the user, habits of the user (e.g., wake/sleep times, when the user watches television, what type of shows the user watches, when a user leaves for work, daily and weekly routines of the user, etc.), preferences of the user (e.g., likes certain books, food, television shows, etc.), and the like.

Before building or updating the profile, the speech processing device 110 may be configured to identify the user that is to be associated with the data. For example, the speech processing device 110 may identify which user made the utterance, which user generated the text from which data is extracted, which user is associated with a device from which data is gathered, and/or which user is associated with a third-party profile from which data is gathered. As an example, if the speech processing device 110 receives an utterance, the speech processing device 110 may identify which user made the utterance by using any known speaker recognition technique. In some embodiments, the speech processing device 110 identifies the user before identifying the data. In other embodiments, the speech processing device 110 identifies the user after identifying the data.

In an embodiment, the speech processing device 110 may identify data from an utterance made by a user by analyzing the word sequence that is determined to be what was most likely uttered by the user in a manner as described above. For example, once the word sequence that was most likely uttered by the user has been determined, the speech processing device 110 may parse the word sequence to identify data that may identify or otherwise be associated with the user.

In a further embodiment, the speech processing device 110 may identify data from an utterance made by a user without analyzing the content of what was spoken. For example, the speech processing device 110 may analyze the utterance using signal processing techniques. By analyzing the utterance using signal processing techniques, the speech processing device 110 may be able to determine an age of the user, a gender of the user, an ethnicity of the user (e.g., based on the user's accent, native language, and/or speech pattern), and the like. For example, an utterance having spectral frequency content or energy greater than a predetermined threshold can be associated with a female and/or a young speaker. Similarly, an utterance having spectral frequency content or energy below a predetermined threshold can be associated with a male or an older speaker. Other features of the speaker's utterance may be analyzed to characterize the speaker as well.

In some aspects, in making the determination of which word sequence was most likely uttered by the user, the speech processing device 110 uses the same acoustic model and the same language model regardless of which user made the utterance. In other aspects, the speech processing device 110 uses different acoustic models and different language models depending on which user made the utterance. The different acoustic models may each be stored in the acoustic model data store 140, in different acoustic model data stores 140, or combinations of the same. Likewise, the different language models may each be stored in the language model data store 150, in different language model data stores 150, or combinations of the same.

In another embodiment, the speech processing device 110 is configured to receive utterances produced by electronic devices operated by a user. For example, the user may turn on a television, radio, or the like, and the speech processing device 110 may identify data associated with the user based on the sound produced by the electronic device. The speech processing device 110 may analyze the sound produced by the electronic device using any known signal processing techniques. The data may include information that the user likes a certain television show, that the user turns on the radio at a certain time of the day, or the like.

In some aspects, the speech processing device 110 recognizes that the user is operating the electronic device producing the sound based on inputs received from a sensor device and/or utterances produced before the electronic device is switched on. For example, the speech processing device 110 may include a camera. The camera may be used to observe a user (e.g., using facial recognition technology)

as the user turns on or otherwise controls the electronic device producing the sound. As another example, the speech processing device 110 may receive utterances from the user prior to the electronic device producing the sound. Based on receiving utterances from a particular user before the electronic device produces the sound, the speech processing device 110 may determine that the particular user is controlling the electronic device producing the sound. As another example, the speech processing device 110 may include a media player. The speech processing device 110 may associate the identified data based on the user controlling the media player.

In an embodiment, the speech processing device 110 may also receive text generated by the user from another device or directly from the user (e.g., by receiving answers to questions posed to the user, the user voluntarily entering information, etc.). The speech processing device 110 may parse the text to identify data that may identify or otherwise be associated with the user.

In an embodiment, the speech processing device 110 may also gather data from devices that share a network with the speech processing device 110 (e.g., a local household network). Such devices may include mobile phones, PDAs, laptops, desktops, tablets, electronic book readers, and the like.

In an embodiment, the speech processing device 110 may also receive or extract a corpus of text (e.g., natural language text) from the social network 190 (e.g., from the user's profile hosted by the social network 190) via network 120. The social network 190 may include any service available over a network that facilitates the building of social relations (e.g., Facebook, Twitter, etc.). The corpus of text may be parsed to identify social network information associated with the user.

In an embodiment, the speech processing device 110 uses natural language processing or artificial intelligence to parse and identify the data. For example, natural language processing or artificial intelligence may be used to identify which data may be useful in building or updating a profile of the user and which data may be discarded.

In an embodiment, the identified data is stored in the user profile data store 180a. As illustrated in FIG. 1, the user profile data store 180a is in communication with the speech processing device 110. The identified data may be stored in the user profile data store 180a and associated with the user that the data is derived from. In some aspects, the stored data constitutes a profile of the user. As the user continues to make utterances, generate text data, or otherwise produce information that may be useful in building or updating a profile, additional data associated with the user may be identified and used to update the profile of the user.

In another embodiment, the identified data is stored in the user profile data store 180b. As illustrated in FIG. 1, the user profile data store 180b is in communication with the speech recognition server device 130. The identified data may be stored in the user profile data store 180b and associated with the user that the data is derived from. As described above, the stored data may constitute a profile of the user. In some embodiments, the data stored in the user profile data store 180b may be encrypted or otherwise scrambled to provide privacy protections.

In another embodiment, the identified data is stored in the user profile data stores 180a and 180b. For example, the same data may be stored in both user profile data stores 180a and 180b. As another example, a first set of data may be stored in the user profile data store 180a and a second set of data may be stored in the user profile data store 180b. In some embodiments, the first set of data may include data that is different than the data included in the second set of data. In other embodiments, the first set of data and the second set of data may include some data that is the same and some data that is different.

In some embodiments, a plurality of user profiles may be associated with a single user. The user may have different user profiles for particular locations and/or times. For example, four user profiles may be associated with a user: (1) the first user profile may be used when the user is at home; (2) the second user profile may be used when the user is at work; (3) the third user profile may be used when it is morning; and (4) the fourth user profile may be used when it is evening. Depending on the time and/or the location of the user, a different user profile may be used when performing speech recognition or acting as an agent for the user.

Figure 2:
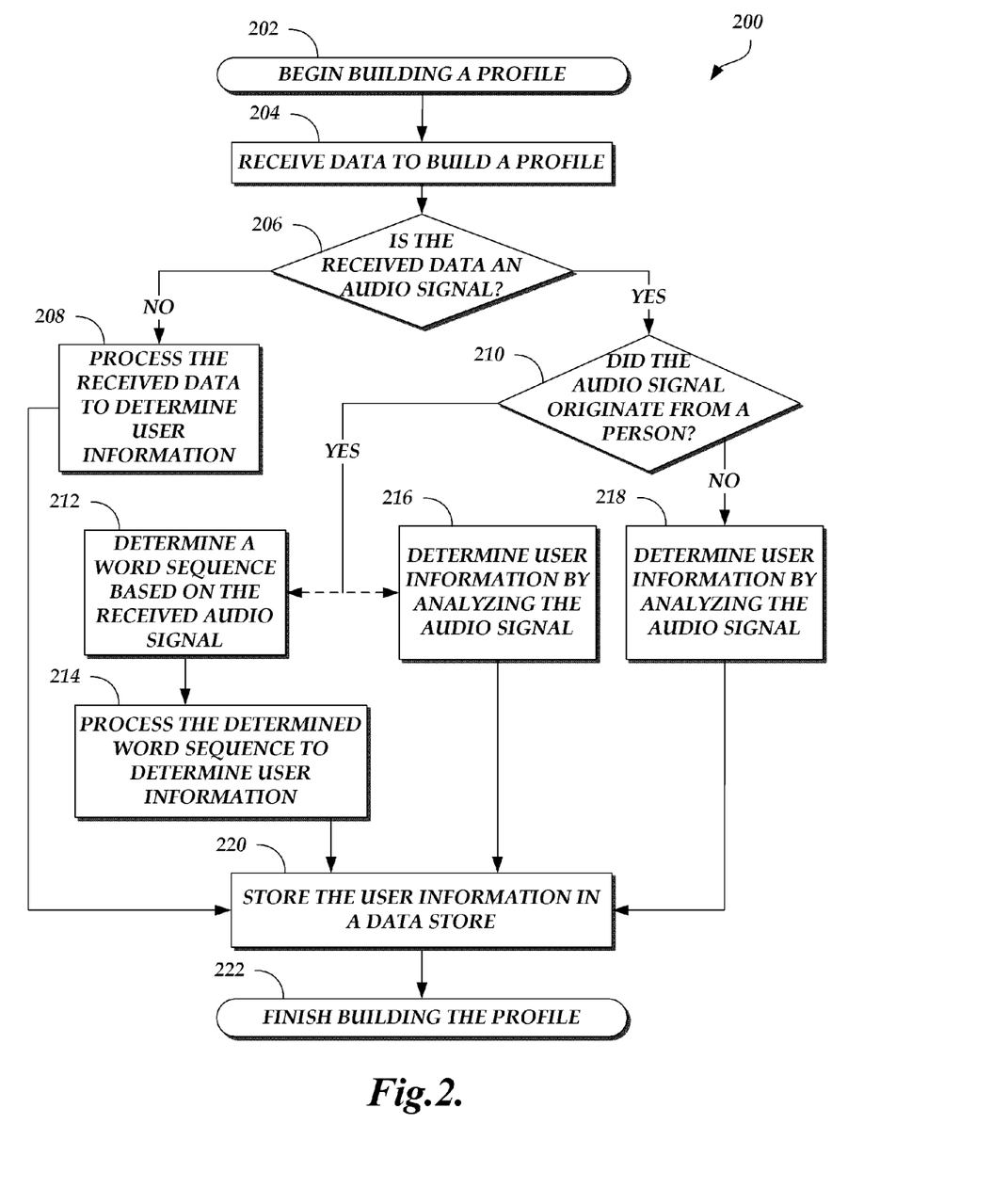
FIG. 2 is a flow diagram depicting an illustrative routine for building a profile.

FIG. 2 illustrates a routine 200 for building a user profile. A speech processing device 110, as described herein with respect to FIGS. 1 and 5, may be configured to execute the routine 200. The routine 200 begins at block 202. The routine 200 may be an interactive routine initiated on demand by a user or an automated routine, such as might be executed on a periodic or aperiodic schedule. In another embodiment, the routine is automatically initiated upon sensing or otherwise detecting the presence of a user, or the user's speech. In one example, a user may make an utterance and the routine 200 uses the utterance to build and/or update a profile of the user.

At block 204, the routine 200 may receive data. The data may originate from a user or from an electronic device that produces sound and that is operated or controlled by a user. For example, the data may be in the form of an audio signal). The data may also originate from a device that shares a network with the speech processing device 110 or from a social network. For example, the data may be in the form of text.

At block 206, the routine 200 may determine whether the received data is an audio signal or in some other form (e.g., text, etc.). If the routine 200 determines that the received data is an audio signal, the routine 200 may proceed to block 210. If the routine 200 determines that the received data is not an audio signal, the routine 200 may proceed to block 208.

At block 208, the routine 200 may process the received data to determine user information. For example, the routine 200 may use natural language processing or artificial intelligence to parse the data and identify which data may be useful in building or updating a user profile and which data may be discarded. In an embodiment, the determined user information may include social network information (e.g., information derived from a profile of a user hosted by a social network, messages posted on the social network, a list of contacts, etc.). The routine may then proceed to block 220.

At block 210, the routine 200 may determine whether the audio signal originated from a person or from an electronic device. If the routine 200 determines that the audio signal originated from a person, the routine 200 may further determine an identity of the user and proceed to block 212 and/or block 216. If the routine 200 determines that the audio signal did not originate from a person, the routine 200 may determine an identity of the user associated with the audio signal (e.g., a person present in the room when the audio signal was received) and proceed to block 218. In an embodiment, the routine 200 may determine the origination of the audio signal by using signal processing techniques.

In an embodiment, the identity of the user may be determined using any techniques known to one skilled in the art, such as methods for performing speaker recognition. Recognition of a speaker may also be based on user information stored in a user profile. For example, if only one particular user is generally present at a certain time of day, utterances received at that time of day are more likely to be from that user. In another example, if only one user generally speaks about a particular topic, an utterance relating to that topic is more likely to be from that user.

At blocks 212 and 214, the routine 200 may analyze the content of a received audio signal. At block 212, the routine 200 may determine a word sequence based on the received audio signal. In an embodiment, the word sequence may represent the word sequence most likely uttered by the user. For example, the routine 200 may use an acoustic model and a language model to analyze the utterance and to determine the word sequence most likely uttered by the user.

At block 214, the routine 200 may process the determined word sequence to determine user information. For example, the routine 200 may use natural language processing or artificial intelligence to parse the data and identify which data may be useful in building or updating a user profile and which data may be discarded. The routine may then proceed to block 220.

At block 216, the routine 200 may determine user information without analyzing the content of a received audio signal. In an embodiment, the routine 200 may determine the user information by analyzing the audio signal using signal processing techniques. Such techniques may yield user information such as the user's age, gender of the user, ethnicity (e.g., based on the user's accent, native language, and/or speech pattern), and the like. The routine may then proceed to block 220.

In some embodiments, the routine 200 performs the operations described in blocks 212 and 214 concurrently with the operations described in block 216. In other embodiments, the routine 200 performs the operations described in blocks 212 and 214 before or after the operations described in block 216. In still other embodiments, the routine 200 performs the operations described in blocks 212 and 214 or the operations described in block 216.

At block 218, the routine 200 may determine user information by analyzing the audio signal. For example, the audio signal may originate from an electronic device being operated or controlled by the user. In an embodiment, the routine 200 may use signal processing techniques to analyze the audio signal. In a further embodiment, the routine 200 may use artificial intelligence or natural language processing to analyze the content of the audio signal. The use of signal processing, artificial intelligence, and/or natural language processing may yield user information such as that the user likes a certain television show, that the user turns on the radio at a certain time of the day, and the like. The routine may then proceed to block 220.

At block 220, the routine 200 may store the user information in a data store. For example, the user information may be stored in the data store in an entry associated with the user from whom the user information is derived from. After the user information has been stored, the building or updating of the profile may be complete, as shown in block 222.

In some embodiments, the user profile may be used to improve speech recognition, as described below with respect to FIG. 3. In other embodiments, the user profile may be used to allow a device to act as an agent for the user, as described below with respect to FIG. 4.

In still other embodiments, the user profile may be used to generate advertisements and/or recommendations for the user. In one embodiment, the speech processing device 110 may generate the advertisements and/or recommendations for display or use on the speech processing device 110 or on another device. In another embodiment, select (may be anonymous or privacy-protected) user profile data may be forwarded to other devices, not shown, to allow other services to improve customized advertising. As an example, a user may verbally indicate that the user is looking to purchase a bicycle. The speech processing device 110 may identify this information and store it in the user's profile. The stored information indicating that the user is looking to purchase a bicycle may then be used to generate bicycle advertisements.

Using the User Profile to Improve Speech Recognition

Figure 3:
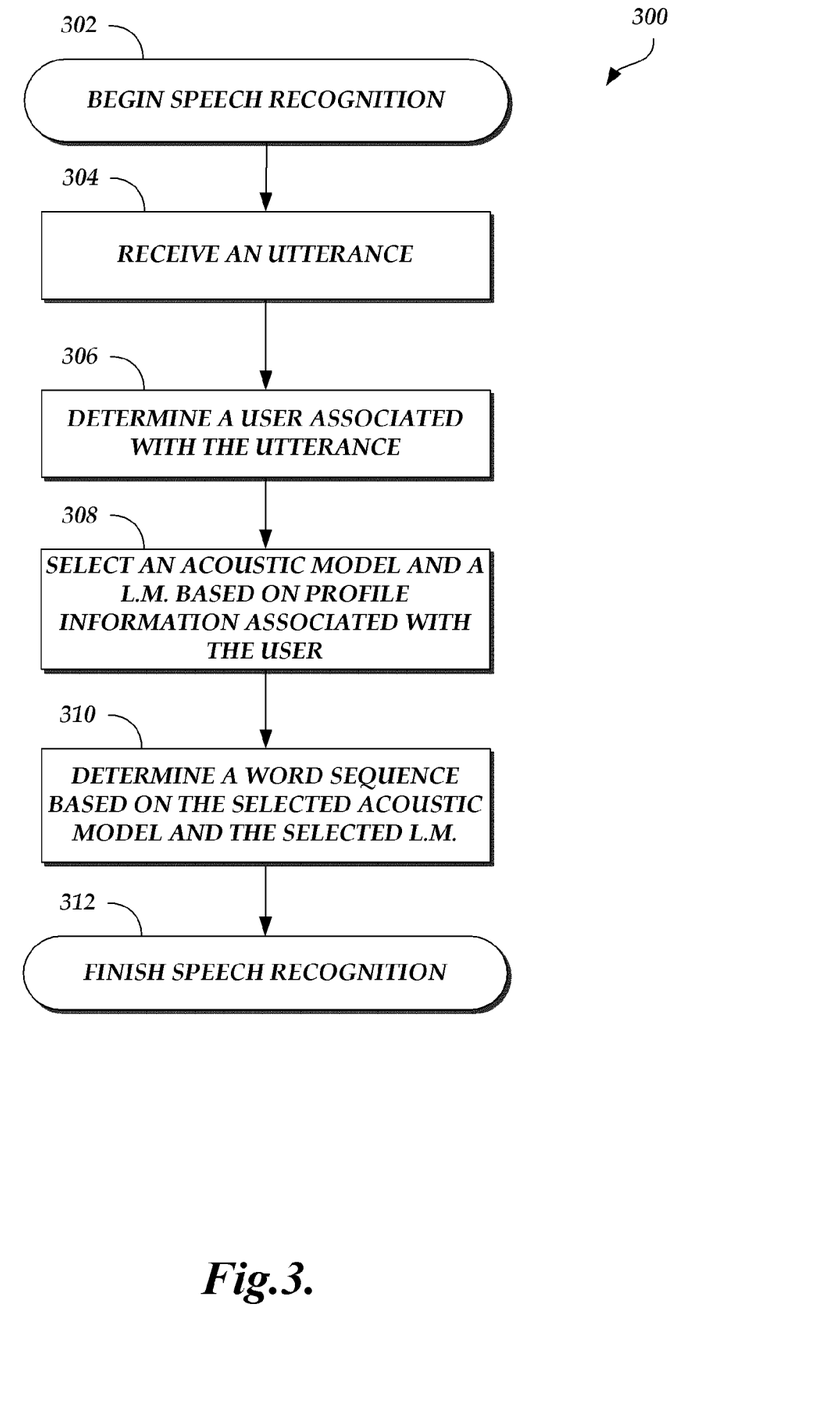
FIG. 3 is a flow diagram depicting an illustrative routine for improving speech recognition based on a user profile.

FIG. 3 illustrates a routine 300 for improving speech recognition by using a user profile. A speech processing device 110, as described herein with respect to FIGS. 1 and 5, may be configured to execute the routine 300. The routine 300 begins at block 302. The routine 300 may be an interactive routine initiated on demand by a user or an automated routine, such as might be executed on a periodic or aperiodic schedule. In one example, a user may make an utterance, which is used to create and update a profile of the user as described herein with respect to FIG. 1. The routine 300 may use the appropriate user profile during speech recognition.

At block 304, the routine 300 may receive an utterance. The utterance may originate from a user or an electronic device that produces sound and that is operated or controlled by a user.

At block 306, the routine 300 may determine which user is associated with the utterance. For example, the routine 300 may use any known speaker recognition technique to make the determination. As another example, if the utterance is generated by an electronic device, the routine 300 may make the determination by identifying the user that is operating or controlling the electronic device as described herein.

At block 308, the routine 300 may select an acoustic model and a language model based on profile information associated with the determined user. As described above, acoustic models and/or language models may correspond to one or more categories of interests (e.g., movies, sports, news, etc.), age groups, ethnicities, gender, accents, languages spoken, habits, preferences, and the like. The profile information may be used to determine which acoustic model and language model best apply to the user. In some aspects, the routine 300 may select different acoustic models and/or different language models for different users.

In some embodiments, the routine 300 may select an acoustic model and/or a language model as described above and may then adapt the acoustic model and/or the language model to the user based on the profile information.

In other embodiments, the routine 300 may not select an acoustic model and/or a language model. For example, the acoustic model and/or language model that applies to the user may not exist in the acoustic model data store 140 or the language model data store 150 of FIG. 1. The routine 300, at block 308, may create the appropriate acoustic model and/or language model.

In still further embodiments, the routine 300 may select multiple acoustic models and/or multiple language models. For example, acoustic models and/or language models may apply to different periods of time. A composition of an acoustic model may vary based on the time of day. A composition of a language model may vary based on the time of day and/or the day of the week, the week of the year, and the like. The routine 300 may select and combine multiple acoustic models and/or multiple language models depending on the current conditions.

At block 310, the routine 300 may determine a word sequence based on an acoustic model and/or a language model. In an embodiment, the word sequence may be determined based on the selected acoustic model(s) and/or the selected language model(s). In a further embodiment, the word sequence may be determined based on the selected acoustic model(s) and/or the selected language model(s) being used in conjunction with a general purpose acoustic model and/or a general purpose language model. For example, the determined word sequence may represent the word sequence most likely uttered by the user. In other embodiments, the routine 300 may transmit the utterance, or data derived from the utterance (e.g., phonemes, n-grams, etc.), to the speech recognition server device 130, which may determine probabilities that a word or phrase was uttered by the user or the word sequence most likely uttered by the user. The routine 300 may then receive the probabilities or the word sequence from the speech recognition server device 130. After the word sequence has been determined, the speech recognition may be complete, as shown in block 312.

Using the User Profile to Act as an Agent for the User

Figure 4:
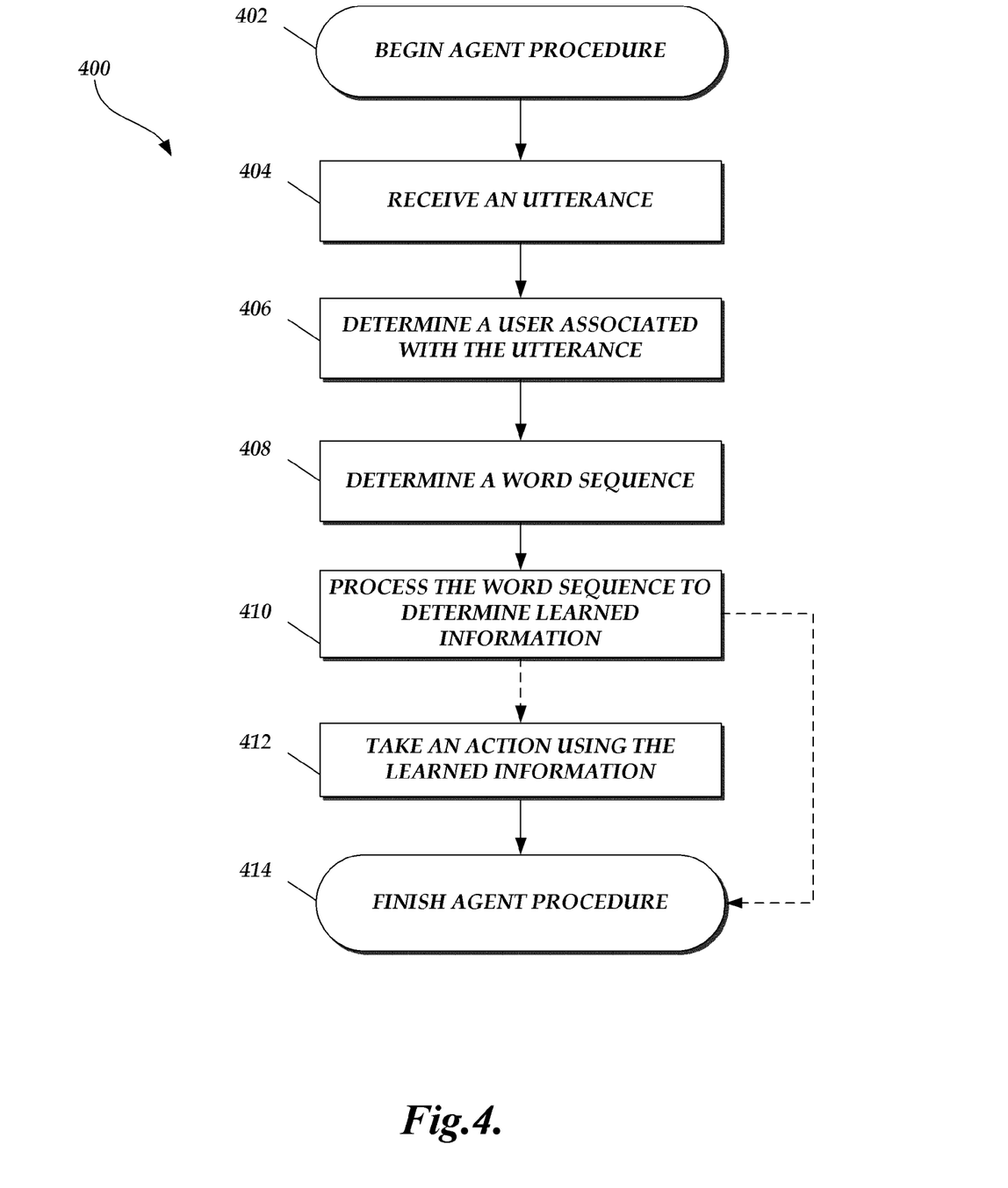
FIG. 4 is a flow diagram depicting an illustrative routine for acting as an agent.

FIG. 4 illustrates a routine 400 for acting as an agent for a user. A speech processing device 110, as described herein with respect to FIGS. 1 and 5, may be configured to execute the routine 400. The routine 400 begins at block 402. The routine 400 may be an interactive routine initiated on demand by a user or an automated routine, such as might be executed on a periodic or aperiodic schedule. In one example, the routine 400 may generate notifications, reminders, or suggestions, update an acoustic model based on what is uttered by a user, perform tasks for the user, and/or authenticate a user.

At block 404, the routine 400 may receive an utterance. The utterance may originate from a user.

At block 406, the routine 400 may determine a user associated with the utterance. For example, the routine 400 may use any known speaker recognition technique to make the determination.

At block 408, the routine 400 may determine a word sequence using an acoustic model and a language model associated with the determined user. For example, the determined word sequence may represent a word sequence most likely uttered by the user. In other embodiments, the routine 400 may transmit the utterance, or data derived from the utterance (e.g., phonemes, n-grams, etc.), to the speech recognition server device 130, which may determine probabilities that a word or phrase was uttered by the user or the word sequence. The routine 400 may then receive the probabilities or word sequence from the speech recognition server device 130.

At block 410, the routine 400 may process (e.g., parse, etc.) the word sequence to learn information ("learned information") associated with the user. For example, learned information may include a temporary condition of the user (e.g., the user is sick, the user is tired, the user is feeling energetic, etc.), information about tasks that need to be completed (e.g., the time and place of a future appointment, the user needs to get groceries, the user needs to remember to call mother for Mother's Day, etc.), notice that a specific person or type of person may arrive (e.g., a personal friend, a person who speaks a different language, etc.), and the like.

In some embodiments, the routine 400 uses natural language processing or artificial intelligence to determine the learned information.

Based on the learned information, the routine 400 may perform one or more operations. In an embodiment, if the learned information relates to, for example, a task that needs to be completed, the routine 400 may generate a notification based on the learned information, as shown at block 412. The notification may be generated immediately, at a predetermined time or a period of time before the task is to be completed, or when the task is to be completed. For example, if the learned information indicates that the user mentioned that the user has a dentist appointment on Friday at noon, the routine 400 may generate a notification on Friday morning alerting the user that the user has a dentist appointment. Likewise, the routine 400 may interact with another application, such as a calendar application, to add a notification within the application. In some embodiments, the notification includes a sound (e.g., a ring), a vibration, reading details of the appointment or task to be completed, and the like.

In some embodiments, a sensor device (e.g., a camera, a touch-sensitive device, a motion-sensing device, a proximity sensor, a microphone, a GPS device, etc.) may be coupled to the device that executes the routine 400 (e.g., the speech processing device 110). The routine 400 may then use the learned information in conjunction with inputs received from the sensor device to generate a notification or suggestion. For example, if the learned information indicates that the user mentioned that the user needs to buy groceries and the sensor device is a GPS device (e.g., a device that provides geographical location), then the routine 400 may generate a notification or suggestion that the user may want to stop and buy groceries when the GPS device provides an input to the routine 400 indicating that the user is passing by a grocery store.

In another embodiment, if the learned information relates to, for example, the arrival of another person, the routine 400 may select a new acoustic model or update the existing acoustic model based on the learned information, as shown at block 412. For example, if the learned information indicates that the user mentioned that the user's Spanish-speaking friend will be arriving shortly, the routine 400 may update the acoustic model accordingly, select an acoustic model that takes into account a Spanish accent, and/or select an acoustic model that understands Spanish. Once the friend arrives and an utterance made by the friend is received by the routine 400, the routine 400 may perform speech recognition, not shown, using the newly updated or selected acoustic model.

In another embodiment, if the learned information relates to, for example, a condition of the user, the routine 400 may modify the acoustic model based on the short-term data, as shown at block 412. For example, if the learned information indicates that the user has a cold, the routine 400 may modify the acoustic model as the user continues to speak to better recognize the speech of someone with a cold.

In another embodiment, if the learned information relates to, for example, a task that needs to be completed, the routine 400 may perform the task for the user, as shown at block 412. For example, if the learned information indicates that the user mentioned that the user is late for work, the routine 400 may draft and transmit an electronic message to the user's boss indicating that the user will be late for work.

In an embodiment, the learned information (or profile information as described herein) may be stored (e.g., in an electronic data store) for later use. For example, the user may use the device that executes the routine 400 (e.g., the speech processing device 110) to perform operations that require authentication. The routine 400 may generate, as shown at block 412, a query based on the learned information and request the user to answer the query. If the answer matches the expected response, then the routine 400 may authenticate the user. Likewise, if the answer does not match the expected response, then the routine 400 may prevent the user from accessing certain functions. As an example, the user may use the device that executes the routine 400 to make a purchase using the user's credit card. The learned information may include a day that the user had a flat tire, and the routine 400 may generate a query asking the user to provide the day that the flat tire occurred. If the user enters the correct date, then the routine 400 may authenticate the user and allow the user to make the purchase. If, however, the user enters the incorrect date, then the routine 400 may not authenticate the user and prevent the user from making the purchase.

In some embodiments, the routine 400 may skip block 412. For example, if the learned information does not lead to the generation of a notification and/or does not lead to a modification of the acoustic model, the routine 400 may skip block 412 and finish the agent procedure, as shown at block 414. Once the routine 400 has evaluated the learned information, the routine 400 may finish the agent procedure, as shown at block 414.

Speech Processing Device

Figure 5:
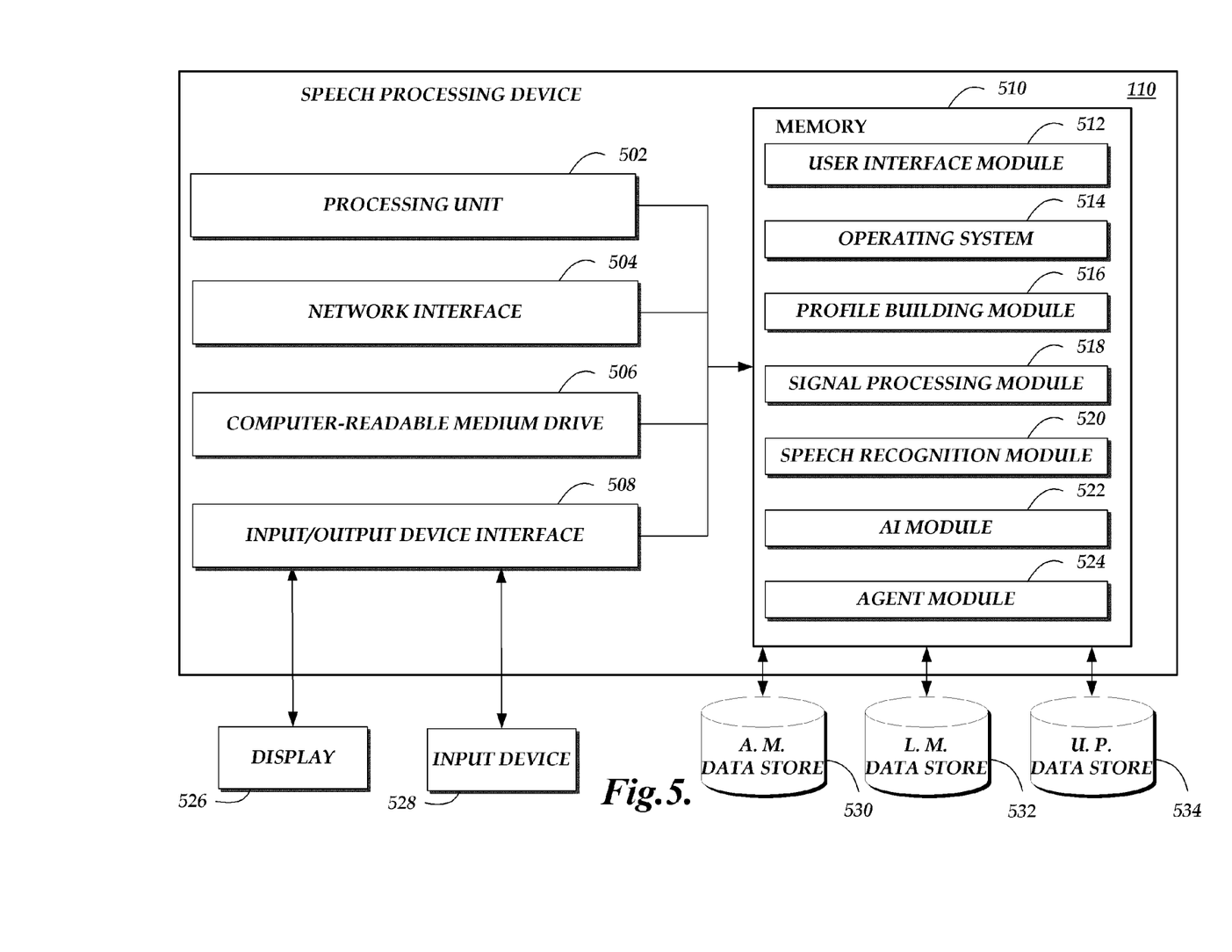
FIG. 5 is a schematic diagram of an illustrative speech processing device.

FIG. 5 is a schematic diagram of a speech processing device 110. The speech processing device 110 includes an arrangement of computer hardware and software components that may be used to implement aspects of the present disclosure. Those skilled in the art will appreciate that the speech processing device 110 may include more (or fewer) components than those shown in FIG. 5. It is not necessary, however, that all of these generally conventional components be shown in order to provide an enabling disclosure.

The speech processing device 110 includes a processing unit 502, a network interface 504, a non-transitory computer-readable medium drive 506, and an input/output device interface 508, all of which may communicate with one another by way of a communication bus. As illustrated, speech processing device 110 is optionally associated with, or in communication with, an optional display 526 and an optional input device 528. The display 526 and input device 528 may be used in embodiments in which users interact directly with the speech processing device 110 (e.g., when the user is running an application on the speech processing device 110). The network interface 504 may provide the speech processing device 110 with connectivity to one or more networks or computing systems. The processing unit 502 may thus receive information and instructions (such as utterances, acoustic models, language models, and text) from other computing systems or services via a network. The processing unit 502 may also communicate to and from memory 510 and further provide output information for an optional display 526 via the input/output device interface 508. The input/output device interface 508 may accept input from the optional input device 528, such as a keyboard, mouse, digital pen, touch screen, or gestures recorded via motion capture. The input/output device interface 528 may also output audio data to speakers or headphones (not shown) or receive audio input (such as an utterance) from a microphone or receiver. The input/output device interface 528 may also be used to couple with a sensor device, such as a camera, a touch-sensitive device, a motion-sensing device, a proximity sensor, a microphone, a GPS device, and the like.

The memory 510 may contain computer program instructions that the processing unit 502 may execute in order to implement one or more embodiments of the present disclosure. The memory 510 generally includes RAM, ROM and/or other persistent or non-transitory computer-readable storage media. The memory 510 may store an operating system 514 that provides computer program instructions for use by the processing unit 502 in the general administration and operation of the speech processing device 110. The memory 510 may further include other information for implementing aspects of the present disclosure. For example, in one embodiment, the memory 510 includes a user interface module 512 that facilitates generation of user interfaces (such as by providing instructions therefor) for display upon a computing device.

In addition, memory 510 may optionally include or communicate with the acoustic model data store 530, the language model data store 532, and the user profile data store 534. The acoustic model data store 530 may include an acoustic model, such as an acoustic model associated with one or more users. The language model data store 532 may include a language model, such as a language model associated with one or more users. The user profile data store 534 may include one or more user profiles. The acoustic model data store 530, the language model data store 532, and the user profile data store 534 may be embodied in hard disk drives, solid state memories, and/or any other type of non-transitory computer-readable storage medium accessible to the speech processing device 110. The acoustic model data store 530, the language model data store 532, and the user profile data store 534 may also be distributed or partitioned across multiple storage devices as is known in the art without departing from the spirit and scope of the present disclosure. In an embodiment, the acoustic model data store 530 may be similar to the acoustic model data store 140 as illustrated with respect to FIG. 1, the language model data store 532 may be similar to the language model data store 150 as illustrated with respect to FIG. 1, and the user profile data store 534 may be similar to the user profile data store 180a as illustrated with respect to FIG. 1.

In addition to the user interface module 512, the memory 510 may include a profile building module 516 that may be executed by the processing unit 502. In one embodiment, the profile building module 516 implements aspects of the present disclosure. For example, the profile building module 516 may build user profiles for one or more users in a manner as described above.

In addition to the profile building module 516, the memory 510 may include a signal processing module 518 that may be executed by the processing unit 502. In one embodiment, the signal processing module 518 implements aspects of the present disclosure. For example, the signal processing module 518 may determine an identity of a user that made an utterance using any known speaker recognition technique and/or determine user information without analyzing the content of the utterance using any known signal processing technique (e.g., determine a user's age, a user's gender, a user's ethnicity, a user's favorite television shows, that the user turns on the radio at a certain time of the day, etc.).

In addition to the signal processing module 518, the memory 510 may include a speech recognition module 520 that may be executed by the processing unit 502. In one embodiment, the speech recognition module 520 implements aspects of the present disclosure. For example, the speech recognition module 520 may be used to recognize speech uttered by a user or electronic device. The speech recognition module 520 may recognize speech using acoustic models and/or language models selected based on a user's profile.

In addition to the speech recognition module 520, the memory 510 may include an artificial intelligence module 522 that may be executed by the processing unit 502. In one embodiment, the artificial intelligence module 522 implements aspects of the present disclosure. For example, the artificial intelligence module 522 may parse and identify data that identifies or is otherwise associated with a user.

In addition to the artificial intelligence module 522, the memory 510 may include an agent module 524 that may be executed by the processing unit 502. In one embodiment, the agent module 524 implements aspects of the present disclosure. For example, the agent module 524 may serve as an agent for the user by generating notifications, reminders, or suggestions, updating an acoustic model based on what is uttered by the user, performing tasks for the user, and/or authenticating the user.

The speech processing device 110 may be embodied in a variety of environments, and may be represented as a single computing device or as multiple computing devices. For example, in some embodiments, the speech processing device 110 is implemented as one or more backend servers capable of communicating over a network. In other embodiments, the speech processing device 110 is implemented by one more virtual machines in a hosted computing environment. The hosted computing environment may include one or more rapidly provisioned and released computing resources, which computing resources may include computing, networking and/or storage devices. A hosted computing environment may also be referred to as a cloud computing environment. In still other embodiments, the speech processing device 110 may be represented as a user computing device capable of communicating over a network, such as a laptop or tablet computer, personal computer, personal digital assistant (PDA), hybrid PDA/mobile phone, mobile phone, global positioning system (GPS) device, electronic book reader, set-top box, camera, clock, watch, audiobook player, digital media player, video game console, in-store kiosk, television, one or more processors, integrated components for inclusion in computing devices, appliances, electronic devices for inclusion in vehicles or machinery, gaming devices, or the like.

It should be noted that the speech recognition server device 130 may include some or all of the components present in the speech processing device 110 as discussed herein with respect to FIG. 5. In addition, the speech recognition server device 130 may include additional components not present in the speech processing device 110 as discussed herein with respect to FIG. 5.

Terminology

Many of the operations of the present disclosure are sufficiently mathematically or technically complex that one or more computing devices may be necessary to carry them out. For example, analyzing a corpus of text to generate a language model, as well as computing the various probabilities, error function values, and relative entropies discussed above, effectively requires resort to a computing device owing to the volume and complexity of the calculations involved. Additionally, a computing device may also be required to generate speech transcriptions and to communicate over a network.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

The invention claimed is:

1. A device comprising:
a profile building component in communication with an electronic data store;
a speech recognition component; and
a sensor configured to detect movement of a user independent of a direction of the user's gaze and without detecting physical contact between the user and the device;
wherein the profile building component is configured to:
  receive, from the sensor, an indication that presence of the user was detected;
  begin listening for utterances from the user in response to receiving the indication;
  detect a first voice signal corresponding to a first utterance of the user;
  determine an identity of the user using the first voice signal;
  process the first voice signal to determine acoustic information about the user, wherein the acoustic information comprises at least one of an age, a gender, an accent type, a native language, or a type of speech pattern of the user;
  perform speech recognition on the first voice signal to obtain a transcript;
  process the transcript to determine language information relating to the user, wherein the language information comprises at least one of a name, hobbies, habits, or preferences of the user;
  store, in a user profile associated with the identity of the user, the acoustic information and the language information;
  determine acoustic model information using at least one of the first voice signal, the acoustic information, or the language information; and
  determine language model information using at least one of the transcript, the acoustic information, or the language information; and
wherein the speech recognition component is configured to:
  receive a second voice signal corresponding to a second utterance of the user;
  determine the identity of the user using the second voice signal;
  perform speech recognition on the second voice signal using at least one of the acoustic model information or the language model information to obtain a word sequence that indicates that a third utterance corresponding to a language characteristic will be uttered by a second user different than the user at a time after a current time; and
  select a second user acoustic model corresponding to the language characteristic for performing speech recognition at the time after the current time.

2. The device of claim 1, wherein speech recognition component is further configured to:
determine event information from the speech recognition results, wherein the event information includes date information; and
provide a reminder to the user concerning the event using the date information.

3. The device of claim 1, wherein the profile building component is further configured to:
receive a third voice signal corresponding to a fourth utterance of a second user;
determine an identity of the second user using the third voice signal;
process the third voice signal to determine second acoustic information and second language information; and
store, in a second user profile associated with the identity of the second user, the second acoustic information and the second language information.

4. A device comprising:
a profile building component in communication with an electronic data store;
a sensor configured to detect presence of a user independent of a direction of the user's gaze and without detecting physical contact between the user and the device; and
a speech recognition component;
wherein the profile building component is configured to:
  receive, from the sensor, an indication that presence of the user was detected;
  begin to listen for utterances from the user in response to receiving the indication;
  receive a first voice signal corresponding to a first utterance of a user;
  determine an identity of the user using the first voice signal;
  process the first voice signal to determine user information and a word sequence that indicates that a second utterance corresponding to a language characteristic is likely to be uttered by a second user different than the user at a time after a current time;
  store the user information in a user profile associated with the identity of the user; and
  select a second user acoustic model corresponding to the language characteristic for performing speech recognition.

5. The device of claim 4, wherein at least one of the profile building component or the speech recognition component is further configured to process the first voice signal to determine user information by performing signal processing on the first voice signal to determine acoustic information.

6. The device of claim 5, wherein the acoustic information comprises at least one of an age, a gender, an accent type, a native language, or a type of speech pattern of the user.

7. The device of claim 4, wherein at least one of the profile building component or the speech recognition component is configured to process the first voice signal to determine user information by performing speech recognition on the first voice signal and obtain the user information from the speech recognition results.

8. The device of claim 7, wherein the user information comprises at least one of a profession, hobbies, habits, preferences, a temporary condition, health, a schedule, an agenda, an itinerary, appointments, tastes, or plans of the user.

9. The device of claim 4, wherein at least one of the profile building component or the speech recognition component is further configured to:
 receive a second voice signal corresponding to a third utterance of a second user;
 determine an identity of the second user using the second voice signal;
 process the second voice signal to determine second user information; and
 store the second user information in a second user profile associated with the identity of the second user.

10. The device of claim 4, wherein at least one of the profile building component or the speech recognition component is further configured to:
 perform speech recognition on the first voice signal to obtain speech recognition results;
 determine acoustic model information using at least one of the first voice signal and the user information; and
 determine language model information using at least one of the speech recognition results and the user information.

11. The device of claim 10, wherein at least one of the profile building component or the speech recognition component is further configured to:
 receive a second voice signal corresponding to a third utterance from the user;
 determine the identity of the user using the second voice signal; and
 perform speech recognition on the second voice signal using the acoustic model information and the language model information to obtain second speech recognition results.

12. The device of claim 4, wherein at least one of the profile building component or the speech recognition component is further configured to:
 perform speech recognition on the first voice signal to obtain speech recognition results;
 take an action using the speech recognition results.

13. The device of claim 4, wherein at least one of the profile building component or the speech recognition component is further configured to:
 perform speech recognition on the first voice signal to obtain speech recognition results;
 determine event information from the speech recognition results, wherein the event information includes date information; and
 provide a reminder to the user concerning the event using the date information.

14. A non-transitory computer-readable medium comprising one or more modules configured to execute in one or more processors of a computing device, the one or more modules being further configured to:
 receive, from a sensor configured to detect presence of a user independent of a direction of the user's gaze and without detecting physical contact between the user and the computing device, an indication that presence of the user was detected;
 begin to listen for utterances from the user in response to receiving the indication;
 detect a first voice signal corresponding to a first utterance of the user;
 determine an identity of the user using the first voice signal;
 determine speech recognition model information using at least one of the first voice signal and user information stored in a user profile associated with the identity of the user;
 perform speech recognition on the first voice signal using the speech recognition model information to obtain speech recognition results that indicate that a second utterance corresponding to a language characteristic is likely to be uttered by a second user different from the user at a time after a current time; and
 select a second user acoustic model corresponding to the language characteristic for performing speech recognition.

15. The non-transitory computer-readable medium of claim 14, wherein the speech recognition model information is acoustic model information.

16. The non-transitory computer-readable medium of claim 14, wherein the speech recognition model information is language model information.

17. The non-transitory computer-readable medium of claim 14, wherein the one or more modules are further configured to take an action using the speech recognition results.

18. The non-transitory computer-readable medium of claim 17, wherein the one or more modules are further configured to:
 determine event information from the speech recognition results, wherein the event information includes date information; and
 provide a reminder to the user concerning the event using the date information.

19. The non-transitory computer-readable medium of claim 17, wherein the one or more modules are further configured to generate at least one of an advertisement or a recommendation using the speech recognition results.

20. The non-transitory computer-readable medium of claim 14, wherein the one or more modules are configured to determine the identity of the user by performing a speaker recognition analysis on the first voice signal.

21. The non-transitory computer-readable medium of claim 14, wherein the user information comprises at least one of age, gender, accent, native language, profession, hobbies, habits, and preferences of the user.

22. A computer-implemented method comprising:
 as implemented by one or more computing devices configured with specific computer-executable instructions,
 receiving, from a sensor configured to detect presence of a user independent of a direction of the user's gaze and without detecting physical contact between the user and the one or more computing devices, an indication that presence of the user was detected;
 begin listening for utterances from the user in response to receiving the indication;
 receiving a first voice signal corresponding to a first utterance of the user, wherein the first utterance is received by the one or more computing devices, and wherein the first utterance is not directed to the one or more computing devices;
 determining an identity of the user using the first voice signal;
 performing speech recognition on the first voice signal, using information from a user profile associated with the identity of the user, to obtain speech recognition results that indicate that a second utterance corresponding to a language characteristic is likely to be uttered by a second user different than the user at a time after a current time;

performing an action using the speech recognition results; and selecting a second user acoustic model corresponding to the language characteristic for performing speech recognition.

23. The method of claim 22, wherein the information from a profile comprises at least one of acoustic model information and language model information.

24. The method of claim 22, wherein performing the action comprises:

determining event information from the speech recognition results, wherein the event information includes date information; and providing a reminder to the user concerning the event information using the date information.

25. The method of claim 24, further comprising storing the event information in a calendar.

26. The method of claim 22, wherein performing the action comprises generating at least one of an advertisement and a recommendation using the speech recognition results.

27. The method of claim 22, further comprising determining a geographical location of the user, and wherein performing an action using the speech recognition results comprises using the geographical location.

28. The method of claim 27, further comprising generating a notification to the user using the speech recognition results and the geographical location of the user.

29. The method of claim 22, wherein performing the action comprises:

generating a query to the user using the speech recognition results; and authenticating the user using an answer provided in response to the query.

30. The method of claim 22, wherein the information from the user profile was previously determined using signal processing, and wherein the information comprises at least one of an age, a gender, an accent type, a native language, or a type of speech pattern of the user.

31. The method of claim 22, wherein the information from the user profile was previously determined using speech recognition, and wherein the information comprises at least one of a name, hobbies, habits, or preferences of the user.

32. The device of claim 1, wherein the profile building component is further configured to:

receive a third voice signal corresponding to a fourth utterance, wherein the fourth utterance is produced by an electronic device;

process the third voice signal to determine additional preferences of the user, wherein the additional preferences of the user comprises an identification of a habit of the user, wherein the habit comprises a time that the user routinely watches television; and store, in the user profile associated with the identity of the user, the additional preferences of the user.

33. The device of claim 4, wherein the profile building component is further configured to:

receive a second voice signal corresponding to a third utterance, wherein the third utterance is produced by an electronic device;

process the second voice signal to determine a habit of the user, wherein the habit comprises a time that the user routinely watches television; and store, in the user profile associated with the identity of the user, the time that the user watches television.

34. The non-transitory computer-readable medium of claim 14, wherein the one or more modules are further configured to:

receive a second voice signal corresponding to a third utterance, wherein the third utterance is produced by an electronic device;

process the second voice signal to determine a habit of the user, wherein the habit comprises a time that the user routinely watches television; and store, in the user profile associated with the identity of the user, the time that the user watches television.

35. The method of claim 22, further comprising:

receiving a second voice signal corresponding to a third utterance, wherein the third utterance is produced by an electronic device;

processing the second voice signal to determine a habit of the user, wherein the habit comprises a time that the user routinely watches television; and storing, in the user profile associated with the identity of the user, the time that the user watches television.

36. The device of claim 1, wherein the second user acoustic model is different than an acoustic model corresponding to the acoustic model information.

37. The device of claim 1, wherein the speech recognition component is further configured to select the second user acoustic model prior to the third utterance being uttered.

* * * * *